June 25, 1929.  C. A. WOODIN  1,718,511
LINE GUIDE FOR TRACTORS
Original Filed Feb. 26, 1927
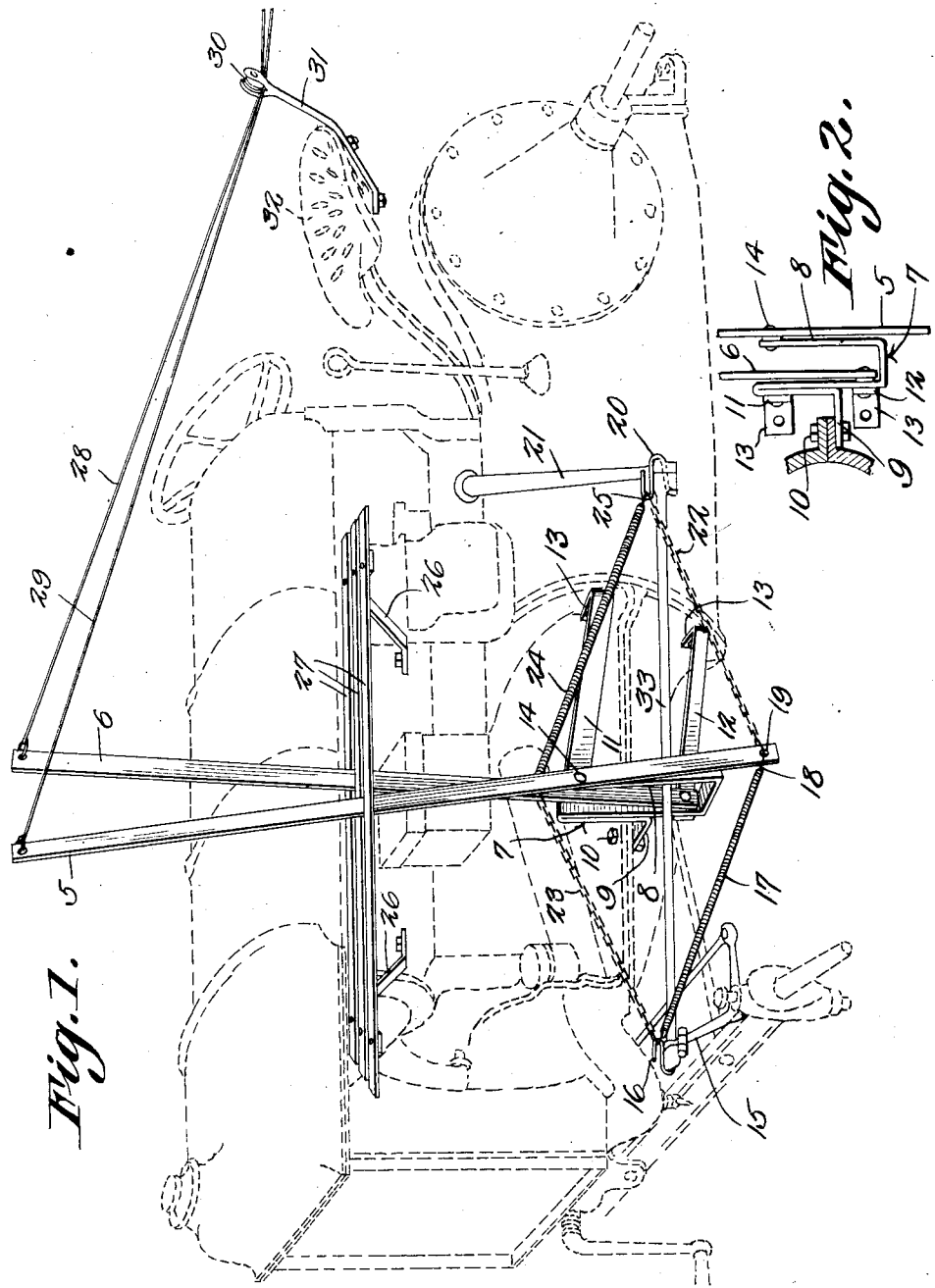

Patented June 25, 1929.

1,718,511

UNITED STATES PATENT OFFICE.

CARL A. WOODIN, OF LAURENS, IOWA.

LINE GUIDE FOR TRACTORS.

Application filed February 26, 1927, Serial No. 171,307. Renewed March 8, 1929.

This invention relates to tractors, and more particularly to a guiding mechanism for tractors, whereby a tractor may be steered and efficiently controlled from a point remote from the tractor.

An important object of the invention is to provide a device of this character which may be readily and easily installed on the usual tractor, eliminating the necessity of making alterations in the tractor construction to install the device.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is an elevational view illustrating a steering mechanism constructed in accordance with the invention.

Figure 2 is a front elevational view of the supporting bracket.

Referring to the drawing in detail, the device includes a pair of vertical pivoted bars 5 and 6 respectively, which bars are connected to the frame of a tractor by means of the bracket member 7, which bracket member is in the form of a length of metal bent to provide a substantially U-shaped supporting member 8, and a laterally extended arm 9 which may be bolted to the tractor, as by means of the bolt 10.

Secured to the bracket member are rearwardly extended arms 11 and 12 respectively, which arms have right angled end portions 13 through which bolts may be passed to secure the arms in position.

The bar 5 is pivotally connected to the supporting member 8 at a point in spaced relation with the lower end of the bar as indicated at 14, the upper end of the bar 5 extending to a point an appreciable distance above the tractor.

Secured to the steering arm of the tractor which is indicated by the reference character 15 is a hook 16, over which one end of the coiled spring 17 is positioned, the opposite end of the coiled spring being supplied with a hook 18 to be passed through the opening 19 passed through the lower end of the bar 5.

Extending rearwardly and connected with the hook 20, which is carried at the lower end of the steering arm 21, is a chain 22 which has its forward end connected to the bar 5, by passing one link of the chain through the opening 19.

The bar 6 is pivotally connected to the U-shaped supporting member 7 at a point adjacent to the lower end thereof, the bar being provided with an opening arranged in spaced relation with the lower end to which the chain 23 connects the forward end of the chain 23 being connected with the hook 16 as clearly shown in Figure 1.

The reference character 24 indicates a coiled spring that has one end thereof connected with the bar 6 at a point adjacent to the chain 23, the opposite end of the coiled spring being connected with the hook 20 at 25.

The upper end of the bar 5 also extends to a point above the upper portion of the tractor so that the leverage of the bars will be increased to the end that the bars may be operated with the minimum amount of exertion on the part of the operator.

Secured to the tractor by means of the arms 26 are spaced bars 27, between which the bars 5 and 6 operate, the bars 27 acting as guides to prevent lateral movement of the bars 5 and 6 while they are in operation.

Flexible members 28 and 29 respectively are connected with the bars 5 and 6 and pass under the pulley 30 which is carried at the upper end of the arm 31 which in turn is secured to the tractor seat 32 to the end that the flexible members 28 and 29 will be held against lateral movement when the tractor is making a turn.

These flexible members 28 and 29 are of lengths to extend to the seat of the agricultural machine being pulled by the tractor so that the operator seated on the seat of the agriculaural machine may, by manipulating the flexible members 28 and 29 operate the front wheels of the tractor to steer the tractor.

It might be further stated that the steering arm 15 and steering arm 21 are connected by means of the usual drag link 33 so that movement of one steering arm is transmitted to the other steering arm when the bars have been moved to steer the tractor.

It will of course be understood that when the steering mechanism as shown and described by applicant is to be used, the usual steering worm and pinion are thrown out of operation.

I claim:

In a device of the character described, a bracket member, means for connecting the bracket member to a tractor, levers pivotally connected with the bracket member, spaced bars supported by the tractor, said levers passing through the space between the bars to guide the levers, and means for connecting the levers to movable elements of the tractor.

In testimony that I claim the foregoing as my own, I have hereto affixed my signature.

CARL A. WOODIN.